(12) United States Patent
Peter

(10) Patent No.: US 6,484,598 B2
(45) Date of Patent: Nov. 26, 2002

(54) ACTUATOR FOR THE CHANGE SPEED SHAFT OF A MOTOR VEHICLE AUTOMATIC TRANSMISSION

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 09/904,413

(22) Filed: Jul. 12, 2001

(65) Prior Publication Data

US 2002/0007691 A1 Jan. 24, 2002

(30) Foreign Application Priority Data

Jul. 14, 2000 (DE) .......................................... 100 34 316
Aug. 11, 2000 (DE) .......................................... 100 40 031

(51) Int. Cl.$^7$ .......................... F16H 59/00; F16H 61/00; F16H 63/00
(52) U.S. Cl. .......................... 74/335; 74/473.12; 477/99
(58) Field of Search .......................... 477/99; 475/153; 74/335, 473.18, 473.12

(56) References Cited

U.S. PATENT DOCUMENTS 5,531,303 A   7/1996   Raszkowski
5,901,608 A  * 5/1999  Takeyama ..................... 74/335
6,367,344 B1 * 4/2002  Vogt et al. ..................... 74/335

FOREIGN PATENT DOCUMENTS

DE   19734023 A1   2/1998
DE   19823767 A1   12/1998
DE   19857714 A1   6/1999

* cited by examiner

Primary Examiner—Dirk Wright
(74) Attorney, Agent, or Firm—Tarolli, Sundheim, Covell, Tummino & Szabo L.L.P.

(57) ABSTRACT

An actuator for the change speed shaft of a motor vehicle automatic transmission comprises a housing, an actuating shaft rotatably mounted in the housing, an electric motor, a reversible, low-loss reduction gearing by which the rotor of the electric motor is directly coupled to the actuating shaft, a pretensioned spiral spring forming an energy storing means by which the actuating shaft may be driven into the parking position independently of the electric motor, an electronic controller for driving the electric motor as a function of control signals, a coupling means for coupling the actuating shaft to the change speed shaft of the automatic transmission. Rotation of the actuating shaft by the coupling means is converted into angles of rotation of the change speed shaft which correspond to the control signals. The actuator replaces a conventional gearshift lever on an automatic transmission.

27 Claims, 5 Drawing Sheets

ACTUATOR FOR THE CHANGE SPEED SHAFT OF A MOTOR VEHICLE AUTOMATIC TRANSMISSION

FIELD OF THE INVENTION

The invention relates to an actuator for a change speed shaft of a motor vehicle automatic transmission.

BACKGROUND OF THE INVENTION

In motor vehicles having an automatic transmission shifting between the various gearbox positions, including the parking position, is done by means of a gearshift lever usually arranged above the transmission tunnel of the vehicle. The gearshift lever is coupled to a change speed shaft of the transmission via a traction cable or linkage.

BRIEF SUMMARY OF THE INVENTION

The invention provides an actuator for a change speed shaft of a motor vehicle automatic transmission comprising no gearshift lever to be actuated manually so that the space provided in conventional vehicles for the gearshift lever can be put to use for other purposes.

The actuator in accordance with the invention comprises:

a housing, an actuating shaft rotatably mounted in the housing, an electric motor with a rotor, a reversible low-loss reduction gearing by which the rotor of the electric motor is directly coupled to the actuating shaft, an energy storing means storing an amount of energy required for driving the actuating shaft independently of the electric motor, an electronic controller for driving the electric motor in response to control signals, a coupling means for coupling the actuating shaft to the change speed shaft, rotation of the actuating shaft by the electronic motor and through the coupling means being converted into angles of rotation of the change speed shaft which correspond to the control signals.

The actuator in accordance with the invention is an electromechanical positioner activated by electrical control signals. The electrical control signals can be generated by switches actuated manually located anywhere as desired in the vehicle, for example, on the dashboard or on the steering wheel.

An objective of the invention is to ensure that the automatic transmission is switched to the parking position when the ignition key is removed with the vehicle stationary, i.e. the driver not being forced to select the parking position before removing the ignition key. To satisfy this requirement, selecting the parking position must also occur even when there is a power failure to the electric motor. It is for this case that an energy storing means is provided storing an amount of energy required for driving the actuating shaft independently of the electric motor. The actuating shaft is thus powered in normal operation by the electric motor through the reduction gearing and in emergency operation via the energy storing means. To permit eliminating a mechanical selector device, however, which is hardly achievable with the necessary reliability, the invention provides for both the energy storing means in emergency operation and the electric motor drive in normal operation being permanently coupled to the actuating shaft. The electric motor thus works against the energy storing means, for example, a tensioned spiral spring, and the energy storing means entrains in emergency operation the electric motor through the reduction gearing which then translates to a higher speed. This concept requires, on the one hand, a particularly rugged electric motor and, on the other, a low-loss design of the reduction gearing.

In accordance with one advantageous embodiment of the invention a brushless external rotor motor is provided as the electric motor, particularly suitable being a 28-pole 4-phase external rotor motor. To permit positional control a rotary shaft encoder is employed achievable by two Hall sensors assigned to the rotor. Such a rotary shaft encoder permits sensing the absolute angles of rotation of the rotor. Driving the stator windings is done by extremely low-impedance FET-type power semiconductors.

A particularly low-loss reduction gearing suitable for communicating a high torque is achieved by a two-stage design. The first stage is a belt drive with a small diameter pulley on the rotor of the electric motor coupled to a larger diameter pulley via belts, more particularly V-belts. The second stage is a planetary gearing, the sun gear of which is connected to the larger diameter pulley for joint rotation and the and planet carrier of which is coupled to the actuating shaft. The reduction ratio of such a two-stage reduction gearing is, for example, approx. 40 to 1.

A further objective of the invention is to ensure that in the absence of an explicit positioning command to the controller any shift action is excluded.

This objective is achieved by one further embodiment of the invention in that the actuating shaft can be selectively arrested in its various discrete rotary positions by a latch active in the non-operated condition, unlatching requiring a current pulse to a solenoid which maintains the latch temporarily in the release position. The solenoid has two exciter windings each independent of the other. The first exciter winding is driven in normal operation by the controller when a positional control is translated. The other exciter winding is driven by a signal derived from the vehicle ignition lock when the ignition key is removed and the vehicle is stationary. For this signal, energy needs to be available independently of the vehicle voltage which, however, may be small and, for example, achievable by a storage capacitor coupled to the vehicle electrics via a decoupling diode.

BRIEF DESCRIPTION OF THE DRAWINGS

Further features and advantages of the invention read from the following description of a preferred embodiment and are evident from the attached drawings to which reference is made and in which.

DETAILED DESCRIPTION OF THE INVENTION

Figure 1:
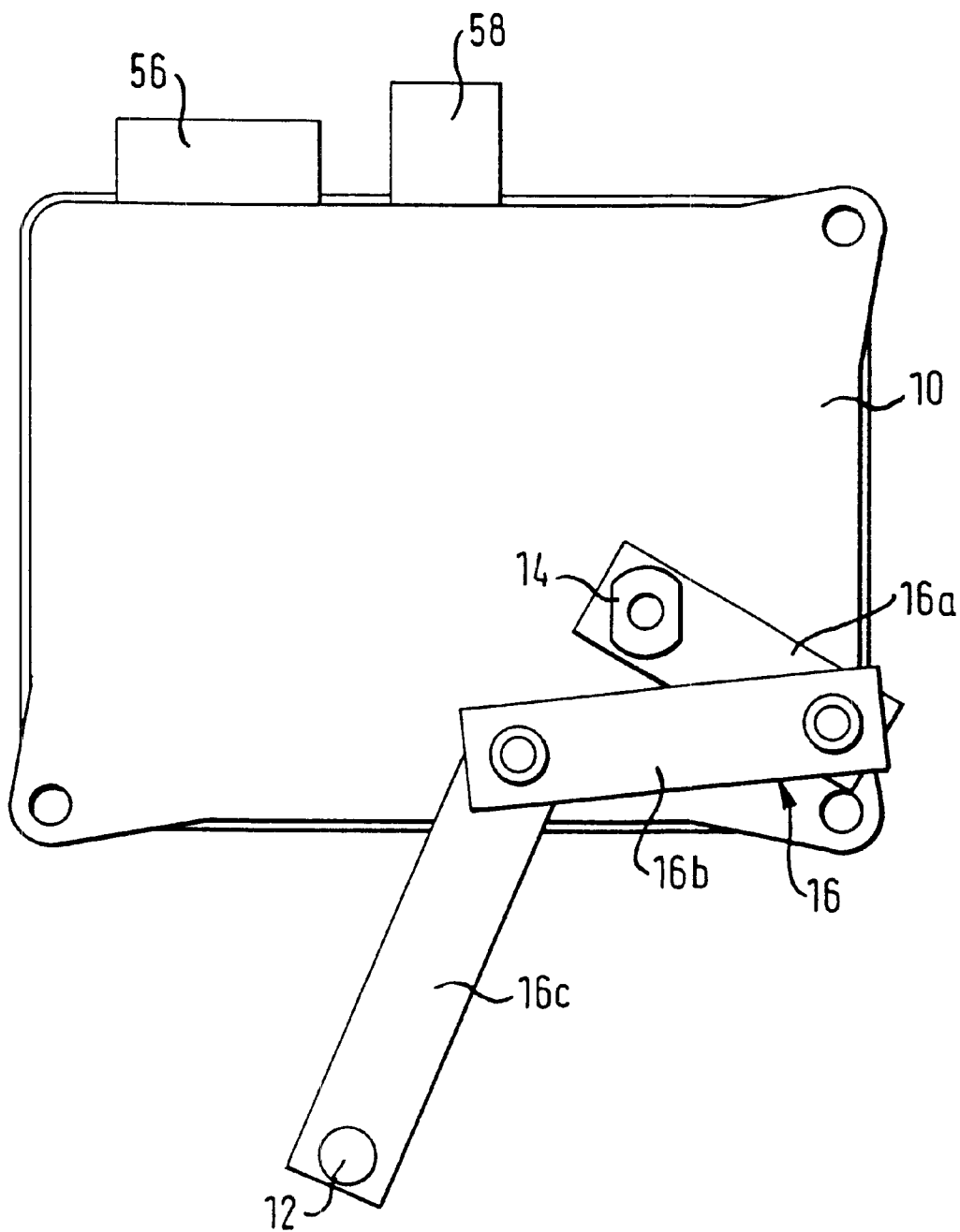
FIG. 1 is a view from above of the upper broadside of the housing of the actuator in a first gearshift position.
Figure 2:
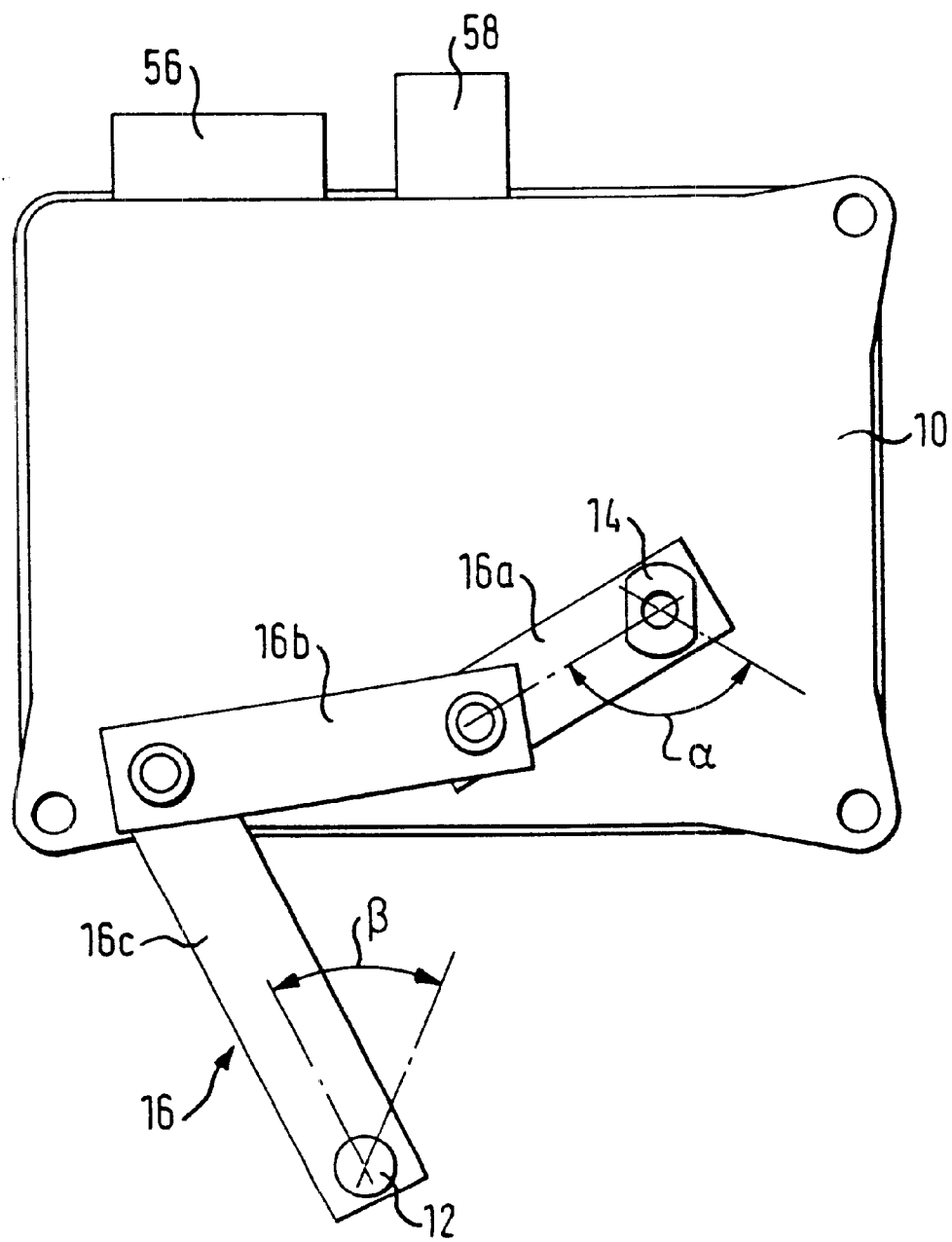
FIG. 2 is an analog view but in a second gearshift position.
Figure 3:
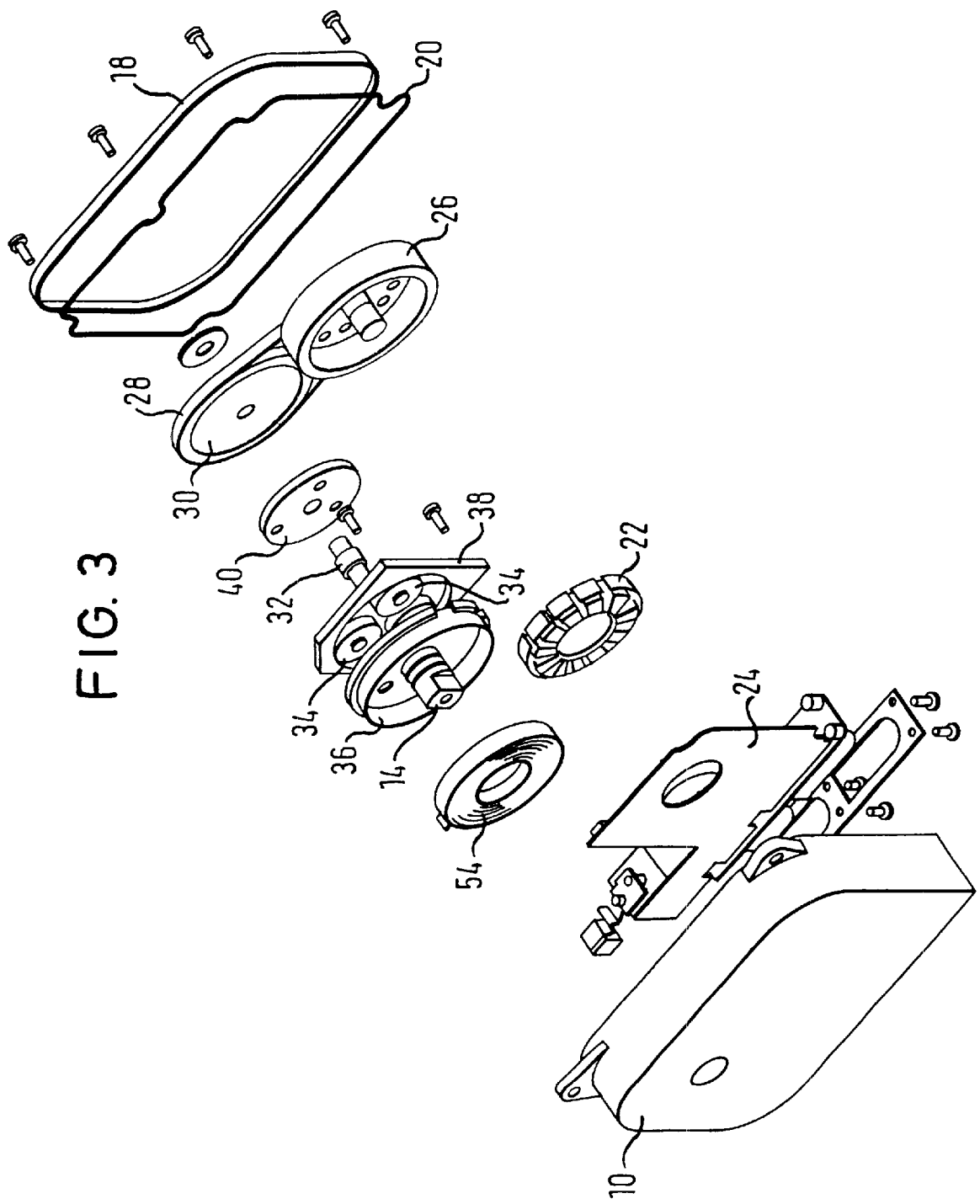
FIG. 3 is an exploded view of the actuator.

The actuator for the change speed shaft of a motor vehicle automatic transmission is housed in a slim parallelepiped 10 which may be fitted to the top of the transmission block alongside a change speed shaft 12 protruding therefrom. The rotatable change speed shaft 12 is able to assume various discrete gearshift positions in keeping with the drive stages of the transmission. Protruding from the housing 10 is an actuating shaft 14, the longitudinal centerline of which is parallel to the longitudinal centerline of the change speed shaft 12. The actuating shaft 14 is coupled to the change speed shaft 12 by a lever linkage 16 consisting of three members 16a, 16b, 16c. The lever linkage 16 is configured such that a knee joint effect is made use of providing in certain gearshift positions an boosted drive torque. One such position is shown in FIG. 1, it corresponding to the parking position of the automatic transmission in which a boosted positioning force is required. As evident from FIGS. 1 and 2 the angular rotation range a of the actuating shaft 14 is translated by the lever linkage into a substantially smaller angular rotation range b of the change speed shaft 12.

Accommodated in the housing 10 is an electromechanical positioner including an electronic controller. The housing 10 is hermetically sealed by a cover 18 with the sealing ring 20.

The positioner contains an electric motor configured as a brushless external rotor motor making use of a stator 22 mounted on a circuit board 24, and an external rotor 26 coupled to a pulley 30 via a drive belt 28. The pulley 30 is mounted on a stub of a pinion 32 and connected thereto for joint rotation. The pinion 32 forms the sun gear of a planetary gearing. The pinion 32 mates as the sun gear with three planet gears 34 mounted on a control disc 36 forming the planet carrier of the planetary gearing. The planet gears 34 run in an ignition lock 38 secured to the housing. Provided between the planet gears 34 and the pulley 30 is an additional supporting plate 40 for the planet gears 34.

Figure 4:
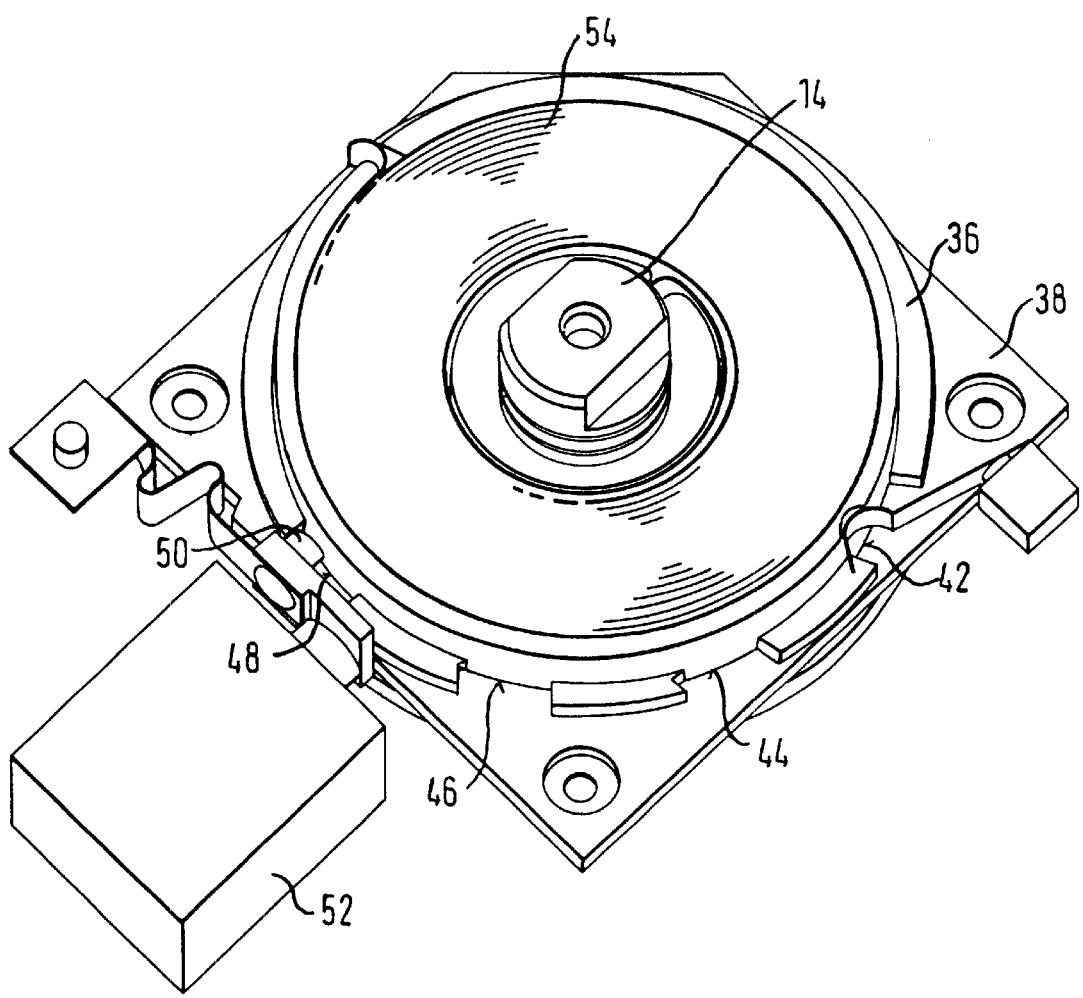
FIG. 4 is a partial view of the actuator in perspective on a magnified scale.
Figure 5:
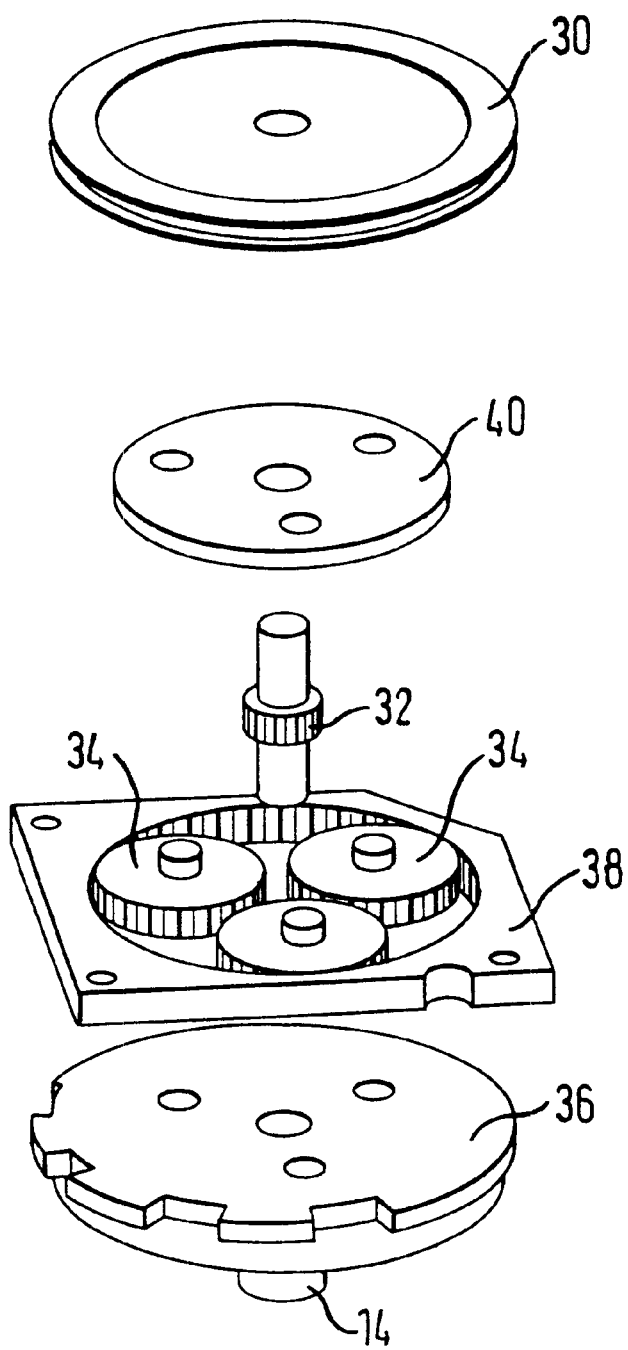
FIG. 5 is a further exploded view of a detail of the actuator.

The control disc 36 is configured integrally with the actuating shaft 14. As particularly evident from FIG. 4 the control disc 36 has on its circumference ratchet recesses 42, 44, 46, 48 arranged corresponding to the various gearshift positions of the automatic transmission. A spring-loaded latch 50 cooperates with the ratchet recesses 42 to 48. In the non-operated condition the control disc 36 with the actuating shaft 14 is blocked by the latch 50 in one of the gearshift positions as dictated by the ratchet recesses. The latch 50 is actuated by a solenoid 52 having two exciter windings independent of each other. Arranged on the side surface area of the control disc 36 is a spiral spring 54 forming a energy storing means. The inner end of the pretensioned spiral spring 54 is joined to the actuating shaft 14 and the outer end is attached to a part fixed in the housing.

Configured on the circuit board 24, alongside the stator 22, is both the circuit for driving the electric motor as well as the electronic controller of the actuator. From the circuit board 24 two connector plugs 56, 58 are brought out from the housing 10.

Operation of the actuator is as follows:

In the normal non-operated condition the actuating shaft 14 with the control disc 36 is blocked by latch 50 in the corresponding gearshift position effective in each case. When a shift command attains the electronic controller, for example, via a CAN bus, the one exciter winding of the solenoid 52 is activated and the latch 50 moved into the release position. At the same time the electric motor is activated by the electronic controller to achieve the desired rotary position of the actuating shaft 14 positionally controlled. Rotation of the external rotor 26 is stepped down by the belt drive by a factor of e.g. 6 and further stepped down by the planetary gearing by a further factor of 7. The high torque of the high-performance electric motor is translated by the reduction gearing to a high actuating torque made available at the actuating shaft 14. Due to the lever linkage 16 the available actuating torque is again increased, for example, to move the change speed shaft 12 from the parking position under load.

Although the actuator provides a high positioning torque the low-loss design of its components more or less excludes any heating up, especially since the shift actions are of very short duration.

The energy storing means formed by the spiral spring 54 is permanently coupled to the actuating shaft 14, just like the electric motor. When the ignition key is removed with the vehicle stationary an activating signal is sent from the ignition lock to the second exciter winding of the solenoid 52 so that the latch 50 is temporarily moved into the release position. The actuating shaft 14 is then moved by the spiral spring 54 into the rotary position corresponding to the parking position, independently of the electric motor drive which is configured so low-loss and reversible that the external rotor 26 can be entrained through the reduction gearing now in a stepping up mode.

In this condition, the driver circuit disconnects the electric motor so that rotation of the rotor is not opposed by magnetic forces due to induced electric current.

In the preferred embodiment of the invention, the parking position is automatically assumed when the ignition switch is turned off, independent of the vehicle electric current supply. In this embodiment, latch 50 is actuated by a bistable solenoid which has a first stable position corresponding to a disengaged (release) condition of the latch. The bistable solenoid is driven by an electric current pulse to switch over between both stable positions. The required electric energy is stored in a capacitor. For a suitable bistable solenoid of a commercially available type a capacitor with a capacity on the order of 20000 $\mu$F at baout 10 V will provide sufficient energy for a driving pulse independent of the vehicle's electric power supply.

According to a further embodiment, an accidental rupturing of the drive belt 28 is detected. The electric motor is internally provided with an incremental angular resolver detecting increments of rotor movement. Another incremental angular resolver is associated with pulley 30. As long as the drive belt 28 is operative, both resolvers are expected to supply synchronized incremental outputs. The electronic controller detects any failure in synchronism between outputs of the resolvers to detect rupturing of the drive belt.

What is claimed is:

1. An actuator for a change speed shaft of a motor vehicle automatic transmission, comprising:
    a housing,
    an actuating shaft rotatably mounted in the housing,
    an electric motor with a rotator,
    a reversible, low-loss reduction gearing by which the rotor of the electric motor is directly coupled to the actuating shaft,
    an energy storing means storing an amount of energy required for driving said actuating shaft independently of the electric motor,
    an electronic controller for driving the electric motor in response to control signals,
    a coupling means for coupling the actuating shaft to the change speed shaft,
    rotation of said actuating shaft by said electric motor and through said coupling means being converted into angles of rotation of said change speed shaft which correspond to said control signals.

2. The actuator as set forth in claim 1, wherein said reduction gearing is of a two-stage type.

3. The actuator as set forth in claim 2, wherein a first stage of said reduction gearing is formed by a driving belt and a pair of belt pulleys.

4. The actuator as set forth in claim 2, wherein a second stage of said reduction gearing is formed by a planetary gearing.

5. The actuator as set forth in claim 1, wherein said actuating shaft can be selectively arrested in discrete rotary positions which each correspond to a gearshift position of said change speed shaft.

6. The actuator as set forth in claim 5, wherein the rotary positions of said actuating shaft are arrested by a latch spring-biased into an engaging condition, said latch being movable by a solenoid into a release position.

7. The actuator as set forth in claim 6, wherein said energy storing means permanently urges said actuating shaft into a rotary position which corresponds to a parking position of said change speed shaft.

8. The actuator as set forth in claim 7, wherein said energy storing means urges said actuating shaft into a rotary position which corresponds to said parking position of the change speed shaft when said latch is in said release position, said electric motor being entrained through said reduction gearing now operating in a stepping up mode.

9. The actuator as set forth in claim 8, wherein said solenoid has two independent exciting windings, a first winding driven by said electronic controller and a second winding driven by a signal from a vehicle ignition switch.

10. The actuator as set forth in claim 6, wherein said actuating shaft is coupled to a control disc for joint rotation, said control disc having ratchet elements on its circumference which are arranged in correspondence to said gearshift positions, said latch selectively engaging either of said ratchet elements.

11. The actuator as set forth in claim 1, wherein said energy storing means is formed by a tensioned spring effective between said housing and said actuating shaft.

12. The actuator as set forth in claim 10, wherein said tensioned spring is a spiral spring arranged on said control disc.

13. The actuator as set forth in claim 1, wherein said coupling means comprises a lever linkage which translates a predefined angle of rotation of said actuating shaft into a smaller angle of rotation of said change speed shaft.

14. The actuator as set forth in claim 13, wherein said lever linkage includes three link members coupled with a force enhancement effect which in a gearshift position corresponding to a parking position of said change speed shaft provides a maximum actuating force.

15. The actuator as set forth in claim 14, wherein said link members are yieldably coupled permitting said change speed shaft to engage predefined gearshift positions when said actuating shaft assumes a corresponding rotary position within an angular tolerance range.

16. The actuator as set forth in claim 1, wherein said electric motor is a brushless multi-pole external rotor motor.

17. The actuator as set forth in claim 16, wherein said electric motor has a stator arranged on a printed circuit board on which said electronic controller is mounted.

18. The actuator as set forth in claim 1, wherein said housing is shaped as a slim parallelepiped.

19. The actuator as set forth in claims 3 and 4, wherein the rotor of said electric motor is coupled via said driving belt to a belt pulley which is in turn coupled to a sun gear of said planetary gearing.

20. The actuator as set forth in claim 19, wherein said actuating shaft is coupled to a planet carrier of said planetary gearing.

21. The actuator as set forth in claim 20, wherein said planetary gearing has planet gears that orbit in an annular gear fixedly mounted in said housing.

22. The actuator as set forth in claim 10, wherein said control disc forms said planet carrier of said planetary gearing.

23. The actuator as set forth in claim 1, wherein said electronic controller comprises a driving circuit disconnecting said electric motor in a non-operative condition permitting rotation of said rotor by energy stored in said energy storing means.

24. The actuator as set forth in claim 1, wherein said electronic controller has an input interface for connection to a bus system.

25. The actuator as set forth in claim 6, wherein said solenoid is a bistable solenoid with a first stable condition corresponding to said engaging condition and a second stable condition corresponding to said release position.

26. The actuator as set forth in claim 25, wherein said bistable solenoid is adapted to be driven from the engagement condition to the release position by a current pulse supplied from a storage capacitor.

27. The actuator as set forth in claim 3, comprising a first incremental angular resolver in said electric motor and a second incremental angular resolver associated with one of said belt pulleys, and detecting means detecting rupture of said driving belt in response to failure of synchronism between signals from said first and second resolvers.

* * * * *